United States Patent
Navot et al.

(10) Patent No.: US 10,847,041 B1
(45) Date of Patent: Nov. 24, 2020

(54) AIRBORNE UNMANNED AERIAL VEHICLE MONITORING STATION WITH ADJUSTABLE IMAGE CAPTURE DEVICES

(71) Applicant: Amazon Technologies, Inc., Seattle, WA (US)

(72) Inventors: Amir Navot, Seattle, WA (US); Gur Kimchi, Bellevue, WA (US); Brandon William Porter, Yarrow Point, WA (US); Avi Bar-Zeev, Oakland, CA (US); Daniel Buchmueller, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 348 days.

(21) Appl. No.: 15/655,009

(22) Filed: Jul. 20, 2017

Related U.S. Application Data

(63) Continuation of application No. 14/724,657, filed on May 28, 2015, now Pat. No. 9,741,255.

(51) Int. Cl.
*G08G 5/00* (2006.01)
*G06Q 10/08* (2012.01)

(52) U.S. Cl.
CPC ......... *G08G 5/0082* (2013.01); *G06Q 10/083* (2013.01); *G08G 5/0013* (2013.01); *G08G 5/0021* (2013.01); *G08G 5/0069* (2013.01); *G08G 5/0078* (2013.01); *G08G 5/0095* (2013.01)

(58) Field of Classification Search
CPC ............... G05D 5/0082; G05D 5/0095; G05D 5/70078; G05D 5/0021; G05D 5/0069; G05D 5/0013; G06Q 10/083
See application file for complete search history.

(56) References Cited

U.S. PATENT DOCUMENTS

| | | |
|---|---|---|
| 5,521,817 A | 5/1996 | Burdoin et al. |
| 6,895,301 B2 | 5/2005 | Mountz |
| 6,950,722 B2 | 9/2005 | Mountz |
| 7,059,566 B2 | 6/2006 | Byers et al. |
| 7,735,752 B1 | 6/2010 | Songer et al. |
| 8,596,571 B2 | 12/2013 | Goelet |

(Continued)

FOREIGN PATENT DOCUMENTS

| | | |
|---|---|---|
| WO | 2014080386 A2 | 5/2014 |
| WO | WO-2015051436 A1 * | 4/2015 |

OTHER PUBLICATIONS

Webster, Michael "DOD proposes new giant spy airship—or is it already here?" Mar. 16, 2009, https://wwwprlog.org/10199736-dod-proposed-new-giant-spy-airshipor-is-it-already-here . . . , downloaded from internet on Apr. 13, 2017, 3 pages.

*Primary Examiner* — Jeffrey C Boomer
(74) *Attorney, Agent, or Firm* — Athorus, PLLC

(57) ABSTRACT

Described is an airborne monitoring station ("AMS") for use in monitoring a coverage area and/or unmanned aerial vehicles ("UAVs") positioned within a coverage area of the AMS. For example, the AMS may be an airship that remains at a high altitude (e.g., 45,000 feet) that monitors a coverage area that is within a line-of-sight of the AMS. As UAVs enter, navigate within and exit the coverage area, the AMS may wirelessly communicate with the UAVs, facilitate communication between the UAVs and one or more remote computing resources, and/or monitor a position of the UAVs.

21 Claims, 9 Drawing Sheets

(56) References Cited

U.S. PATENT DOCUMENTS

| | | |
|---|---|---|
| 9,164,506 B1 | 10/2015 | Zang |
| 9,305,280 B1 | 4/2016 | Berg et al. |
| 9,348,333 B1 | 5/2016 | Buchmueller et al. |
| 9,471,059 B1 | 10/2016 | Wilkins |
| 2003/0213868 A1 | 11/2003 | Brunner et al. |
| 2007/0031151 A1* | 2/2007 | Cunningham ..... H04B 10/1123 398/131 |
| 2008/0210810 A1 | 9/2008 | Parmley |
| 2009/0072078 A1 | 3/2009 | Choi et al. |
| 2009/0294573 A1 | 12/2009 | Wilson et al. |
| 2010/0102164 A1 | 4/2010 | Brutoco |
| 2011/0084162 A1 | 4/2011 | Goossen et al. |
| 2011/0228047 A1 | 9/2011 | Markham et al. |
| 2012/0226394 A1 | 9/2012 | Marcus |
| 2012/0248241 A1 | 10/2012 | Goelet |
| 2012/0302160 A1 | 11/2012 | Silny et al. |
| 2013/0334371 A1 | 12/2013 | Potter et al. |
| 2014/0026840 A1 | 1/2014 | Okada et al. |
| 2014/0032034 A1 | 1/2014 | Raptopoulos et al. |
| 2014/0200759 A1 | 7/2014 | Lu et al. |
| 2014/0254896 A1 | 9/2014 | Zhou et al. |
| 2014/0263840 A1 | 9/2014 | Potter et al. |
| 2014/0277854 A1 | 9/2014 | Jones et al. |
| 2014/0344118 A1 | 11/2014 | Parpia et al. |
| 2014/0354809 A1 | 12/2014 | Shondel |
| 2015/0120094 A1 | 4/2015 | Kimchi et al. |
| 2015/0134143 A1* | 5/2015 | Willenborg .......... G05D 1/0094 701/2 |
| 2015/0183528 A1 | 7/2015 | Walsh et al. |
| 2015/0336671 A1 | 11/2015 | Winn et al. |
| 2015/0339933 A1 | 11/2015 | Batla et al. |
| 2015/0379874 A1 | 12/2015 | Ubhi et al. |
| 2016/0054733 A1 | 2/2016 | Hollida et al. |
| 2016/0107750 A1 | 4/2016 | Yates |
| 2016/0117931 A1* | 4/2016 | Chan ................... G08G 5/0069 701/120 |
| 2016/0156406 A1 | 6/2016 | Frolov et al. |
| 2016/0180719 A1* | 6/2016 | Wouhaybi ............ G08G 5/0082 701/4 |
| 2016/0214717 A1 | 7/2016 | Silva |
| 2016/0253808 A1 | 9/2016 | Metzler et al. |
| 2016/0304217 A1* | 10/2016 | Fisher ................... B64C 39/024 |
| 2016/0307448 A1 | 10/2016 | Salnikov et al. |
| 2016/0309124 A1 | 10/2016 | Yang et al. |
| 2016/0364989 A1 | 12/2016 | Speasl et al. |
| 2016/0371985 A1 | 12/2016 | Kotecha |

* cited by examiner

AIRBORNE UNMANNED AERIAL VEHICLE MONITORING STATION WITH ADJUSTABLE IMAGE CAPTURE DEVICES

CROSS-REFERENCE TO RELATED APPLICATION

This application is a continuation of and claims priority to U.S. application Ser. No. 14/724,657, filed May 28, 2015, entitled "Airborne Unmanned Aerial Vehicle Monitoring Station," which is incorporated herein by reference in its entirety.

BACKGROUND

Many companies package items and/or groups of items together for a variety of purposes, such as e-commerce and mail-order companies that package items (e.g., books, CDs, apparel, food, etc.) to be shipped to fulfill orders from users. Retailers, wholesalers, and other product distributors (which may collectively be referred to as distributors) typically maintain an inventory of various items that may be ordered by users. A ground-based building, such as a materials handling facility, may maintain and process and ship such inventory.

Typically ordered items are packed in shipping packages (e.g., corrugated boxes) and shipped to the user's residence or place of business. Physical delivery of items to user specified locations has improved dramatically over the years, with some retailers offering next day delivery of ordered items. The final or last mile delivery of physical items to a user specified location is traditionally accomplished using a human controlled truck, bicycle, cart, etc. For example, a user may order an item for delivery to their home. The item may be picked from a ground-based materials handling facility, packed and shipped to the user for final delivery by a shipping carrier. The shipping carrier will load the item onto a truck that is driven by a human to the final delivery location and the human driver, or another human companion with the driver, will retrieve the item from the truck and complete the delivery to the destination. For example, the human may hand the item to a recipient, place the item on the user's porch, store the item in a post office box, etc.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (i.e., through an intermediary), mechanical, chemical, optical, or electrical.

DETAILED DESCRIPTION

This disclosure describes systems and methods for monitoring from an airborne monitoring station ("AMS") a plurality of unmanned aerial vehicles ("UAVs") positioned within an AMS coverage area. The AMS may be an airship that remains at a high altitude that monitors a coverage area that is within a defined distance of the AMS. As discussed below, the AMS may include a plurality of image capture devices oriented toward the coverage area that obtain images of UAVs as the UAVs enter, navigate within and exit the coverage area. Likewise, the AMS may wirelessly communicate with the UAVs, wirelessly communicate with one or more remote computing resources, and/or facilitate communication between the UAVs and the one or more remote computing resources. For example, the AMS may obtain images of the UAVs and/or receive initial position information from the UAVs, and provide the images and/or initial position information to a remote computing resource. The remote computing resource may process the images and send UAV instructions to the AMS. The AMS, upon receiving the UAV instructions from the remote computing resource, sends the UAV instructions to the UAV for execution.

Utilizing the AMS enables line-of-sight communication with multiple UAVs within the coverage area. In some implementations, the communication may be utilized to send navigation commands to the UAVs to control the operation and navigation of the UAVs. In other implementations, the communication may be utilized to provide information to and/or receive information from the UAVs.

Figure 1:
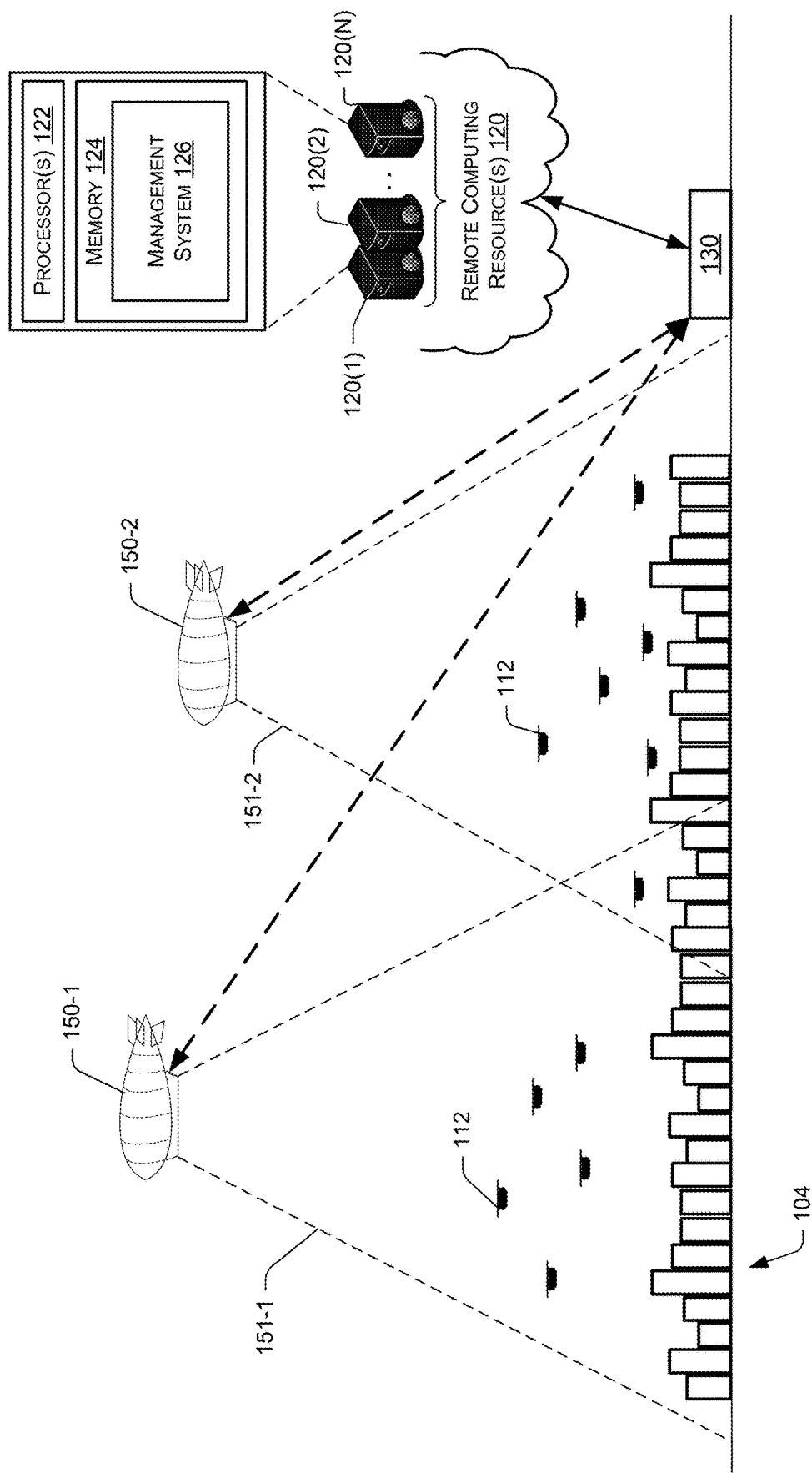
FIG. 1 is a diagram illustrating an environment that includes aerial monitoring stations, according to an implementation.

FIG. 1 is a block diagram illustrating an environment that includes a plurality of AMSs, according to an implementation. As illustrated, one or more AMSs 150 may be positioned above a metropolitan area 104, or other location, at a high altitude (referred to herein as an AMS altitude). For example, the AMS 150-1 may be positioned at an altitude of 45,000 feet or more above the metropolitan area 104 and/or at a lower position. Positioning the AMSs 150 at an altitude above 45,000 takes them out of the flight path of commercial airplanes, which generally have a maximum usable altitude of approximately 42,000 feet. Because the AMSs 150 are not in the flight path of other aerial vehicles, they can remain at a position for extended periods of time without disrupting other aerial systems. Likewise, by placing the AMSs 150 at an AMS altitude, each AMS may have a coverage area that encompasses a large geographic area. For example, AMS 150-1 has an AMS coverage area 151-1 that covers a first portion of the metropolitan area 104 and AMS 150-2 has an AMS coverage area 151-2 that covers a second portion of the metropolitan area 104. In some implementations, the AMS coverage area 151 may be an area that is within a defined distance of the AMS. In other implementations, the AMS coverage area 151 may be defined as the area that is visible, or within a visible line-of-sight of the AMS 150 so that image capture devices of the AMS can obtain images of the coverage area.

As discussed further below, each AMS 150 may monitor a respective AMS coverage area, tracking positions of UAVs 112 within the AMS coverage area 151, wirelessly communicating with the UAVs 112 and wirelessly communicating with a remote location 130 that includes one or more remote computing resources 120. For example, each UAV 112 may wirelessly send initial position information (e.g., latitude, longitude, and altitude), images, flight path information, and/or other data to an AMS 150, along with an identifier of the UAV. The AMS 150 may likewise wirelessly transmit the initial position information, images, flight path information, and/or other data to the remote computing resources 120. Likewise, the remote computing resources may wirelessly send UAV navigation instructions and/or other commands to the AMS 150. The AMS, upon receiving UAV navigation instructions and/or other commands that are for a UAV in the coverage area 151 of the AMS 150, may wirelessly send those navigation instructions and/or other commands to the UAV 112.

Each of the AMSs 150 may be positioned at different locations and/or altitudes and cover different AMS coverage areas 151. In some implementations, as illustrated, one or more AMS coverage areas may partially overlap so that complete coverage of an area can be established.

The wireless communication between the AMS 150 and the UAVs 112 may be any form of wireless communication. For example, the wireless communication between the AMS 150 and one or more UAVs 112 within the AMS coverage area 151 may be any form of radio frequency communication. For example, the AMS 150 and the UAVs 112 may directly communicate using line of sight radios operating in the service and aviation bands of the amplitude modulation (AM)/frequency modulation (FM), very high-frequency (VHF)/ultra-high frequency (UHF) spectrum, from 300 mega-hertz (MHz)-420 Mhz. In other implementations, the wireless communication may utilize a Wi-Fi, Bluetooth, Near Field Communication (NFC), and/or any other form of direct wireless connection. In still other implementations, the wireless communication between the AMS 150 and the UAV 112 may be indirect. For example, the wireless communication may utilize an existing wireless communication network, such as satellite, cellular, etc.

In a similar manner, the wireless communication between the AMS 150 and the remote computing resources 120 may be any form of wireless communication. For example, the wireless communication between the AMS 150 and remote computing resource 120 may utilize a form of free-space optical communication, such as a laser-based communication, microwave, etc. Alternatively, or in addition thereto, the AMS 150 and the remote computing resources 120 may communicate using omnidirectional and/or directional antennas operating in one of the wireless communication frequencies. In other implementations, the wireless communication between the AMS 150 and the remote computing resources 120 may be indirect. For example, the wireless communication may utilize an existing wireless communication network, such as satellite, cellular, etc.

As discussed below, each AMS may utilize image capture devices to obtain information about the AMS coverage area, such as topography, monitor positions of UAVs within the AMS coverage area 151, monitor weather in the AMS coverage area 151 and/or monitor approaching weather. In some implementations, each UAV may wirelessly send initial position information to the AMS 150. The AMS may utilize the initial position information to orient a camera in a direction of the UAV and/or to alter the zoom of the camera based on the altitude of the UAV 112 and the altitude of the AMS 150. The camera may then be utilized to obtain images of the UAV as the UAV 112 navigates within the AMS coverage area 151. In some implementations, for each UAV in the AMS coverage area, a respective camera of the AMS 150 may be oriented toward and used to obtain images of the UAV as it navigates within the AMS coverage area. In other implementations, the plurality of cameras of the AMS may be oriented to cover different portions of the AMS coverage area 151 such that the images obtained for all of the cameras encompass substantially all of the AMS coverage area. In still other implementations, some of the plurality of cameras may be configured to orient toward positions of UAVs and track UAVs within the coverage area and other cameras of the plurality of cameras may be oriented toward portions of the coverage area.

In some implementations, images obtained by the cameras may be processed at the AMS to determine topography changes, weather changes, positions of UAVs, etc. The images may also be stored at the AMS. In other implementations, the obtained images are sent to the remote computing resource for processing.

In addition to obtaining initial position information from the UAVs within the AMS coverage area 151, the AMS 150 may receive images and/or other data from the UAVs. For example, the UAVs may obtain images using a camera or other image capture device on the UAV and wirelessly transmit those images to the AMS 150. Alternatively, if the UAV has received sense and avoid information identifying the topography of the area in which the UAV is operating, the UAV may obtain images and/or depth information of the area and compare the obtained images/depth information with the provided sense and avoid information. If differences between the provided sense and avoid information and the obtained images/information is determined, the UAV 112 may provide that difference information to the AMS 150. Other data, such as weather, detected obstacles, etc., may be sent to the AMS.

Like the images, the AMS 150 may also send other data received from the UAVs to the remote computing resources for additional processing and/or may store or process the additional data at the AMS 150.

In some implementations, the AMS 150 may navigate to a lower altitude (e.g., 2,000 feet above the metropolitan area 104) to provide advertising, improve the visual coverage of the AMS coverage area (e.g., during inclement weather), etc. For example, the exterior of the AMS 150 may include one or more output devices (e.g., visual, audible) that can be used to present advertising or other information about items and/or services.

During inclement weather, the AMS 150 may navigate to a lower altitude so that communication with the UAVs 112 and/or the remote computing resources 120 may be maintained. Alternatively, or in addition thereto, if communication between the AMS 150 and the remote computing resources 120 is unavailable or interrupted (e.g., inclement weather, inoperable antenna), the AMS 150 may be configured to operate independent of the remote computing resources 120, providing and/or receiving information from the UAVs 112. In such an implementation, the AMS 150 may store information that otherwise would send to the remote computing resources 120. When communication is restored, the stored information may be transmitted from the AMS 150 to the remote computing resources 120.

If communication between the AMS and one or more of the UAVs 112 within the coverage area 151 of the AMS 150 is interrupted, the AMS may attempt to communicate with the UAV using one or more other wireless communication channels. For example, if a direct communication between the UAV 112 and AMS 150 is interrupted, the AMS 150 may attempt to communicate with the UAV using one or more indirect communication channels.

The remote computing resources 120 may form a portion of a network-accessible computing platform implemented as a computing infrastructure of processors, storage, software, data access, and other components that is maintained and accessible via a network. Services, such as UAV management and/or AMS management, offered by the remote computing resources 120 do not require that a user have knowledge of the physical location and configuration of the system that delivers the services.

The remote computing resources, upon receiving images, UAV position information, and/or other data from an AMS may process that data to, for example, determine a UAV represented in the image. In some implementations, the remote computing resources 120 may likewise generate navigation commands, such as delivery destinations, flight paths, etc., for one or more UAVs. Such commands are wirelessly sent from the remote computing resources 120 to a respective AMS 150 and the AMS wirelessly sends the commands to the UAV.

As illustrated, the remote computing resources 120 may include one or more servers, such as servers 120(1), 120(2) . . . 120(N). These servers 120(1)-(N) may be arranged in any number of ways, such as server farms, stacks, and the like that are commonly used in data centers. Furthermore, the servers 120(1)-(N) may include one or more processors 122 and memory 124 that may store management system 126. The management system 126 may be configured, for example, to perform location planning for the AMSs, navigation plans for UAVs 112, etc.

Figure 2:
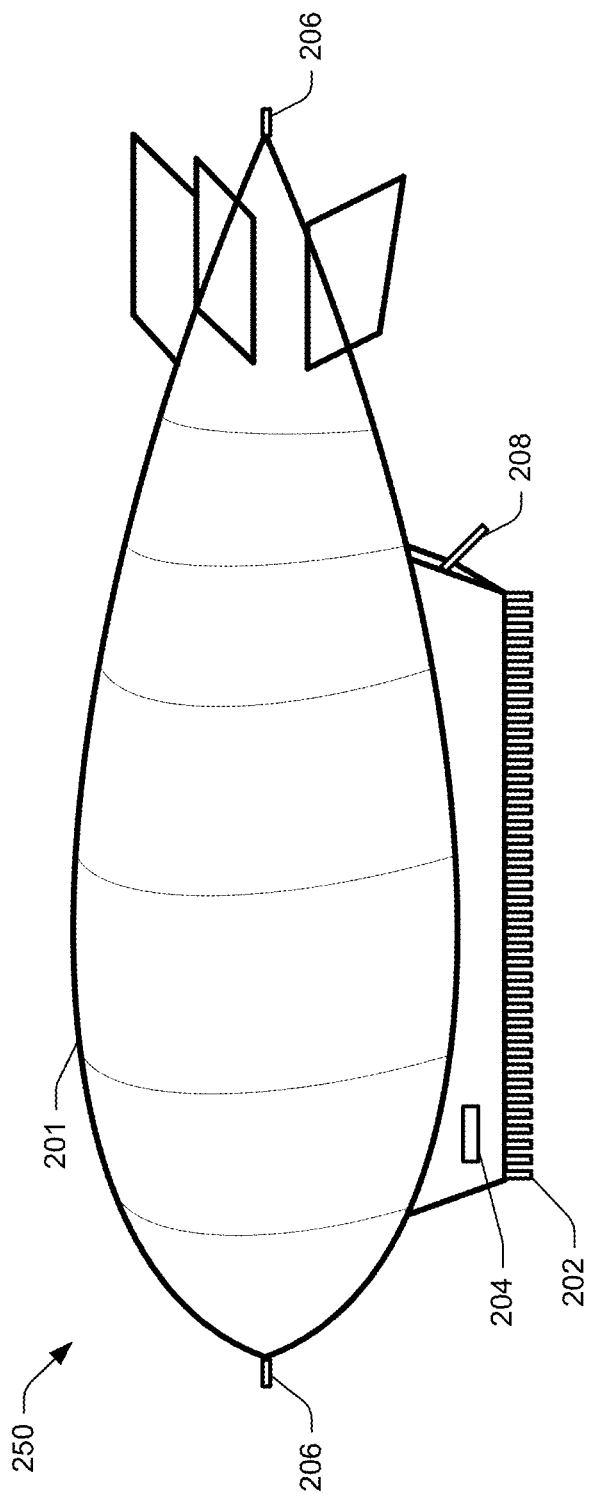
FIG. 2 is a block diagram of an aerial monitoring station, according to an implementation.

FIG. 2 is a block diagram of an AMS 250, according to an implementation. The AMS 250 may be supported by and/or incorporated into an airship 201. An airship, or dirigible, is a type of aerostat or lighter-than-air aircraft that can navigate through the air under its own power. Airships gain their lift from gas that is less dense than the surrounding air, such as helium or hot air. Any type of airship, such as a non-rigid airship, a semi-rigid airship, or a rigid airship may be utilized as part of the AMS. In some implementations, the AMS may be hundreds of feet long. In other implementations, the airship may have the shape of a toroid, a tubular shape, a spherical shape, include multiple portions, be longer, shorter, etc.

Each AMS 250 may also include a plurality of image capture devices 202 oriented toward the AMS coverage area. Any number of image capture devices may be incorporated into the AMS 250. In one implementation, there are approximately 100 image capture devices. The image capture devices may be any form of device such as a digital still camera, video camera, thermographic imaging device, etc.

As discussed above, the image capture devices may be configured to orient in a direction of a UAV and/or be oriented toward a portion of the AMS coverage area. Regardless of orientation, the image capture devices may obtain images that are processed and/or stored at the AMS 250 and/or wirelessly sent from the AMS 250 to the remote computing resources.

In some implementations, one or more of the cameras may also be accompanied with an illumination element (e.g., laser, calumniated light) that may also be oriented in a direction of the UAV so that the light will reflect off the UAV and increase the detectability of the UAV. For example, as discussed below with respect to FIG. 7, the UAV may include one or more reflectors that may reflect the light so that the reflected light is represented in a captured image, thereby increasing the detectability of the UAV.

The AMS may also include a weather station 204 that can monitor the weather (e.g., wind speed, temperature, dew point, precipitation, etc.) at the AMS coverage area. Likewise, the weather station 204 may utilize sensors 206 or cameras to monitor for weather that may be approaching the AMS coverage area.

The AMS 250 may also include one or more wireless communication components 208 that may be utilized to enable wireless communication between the AMS and the UAVs and/or between the AMS and the remote computing resources. The communication component 208 may include one or more antennas, communication dishes, and/or lasers for receiving and/or transmitting wireless communications.

Figure 3:
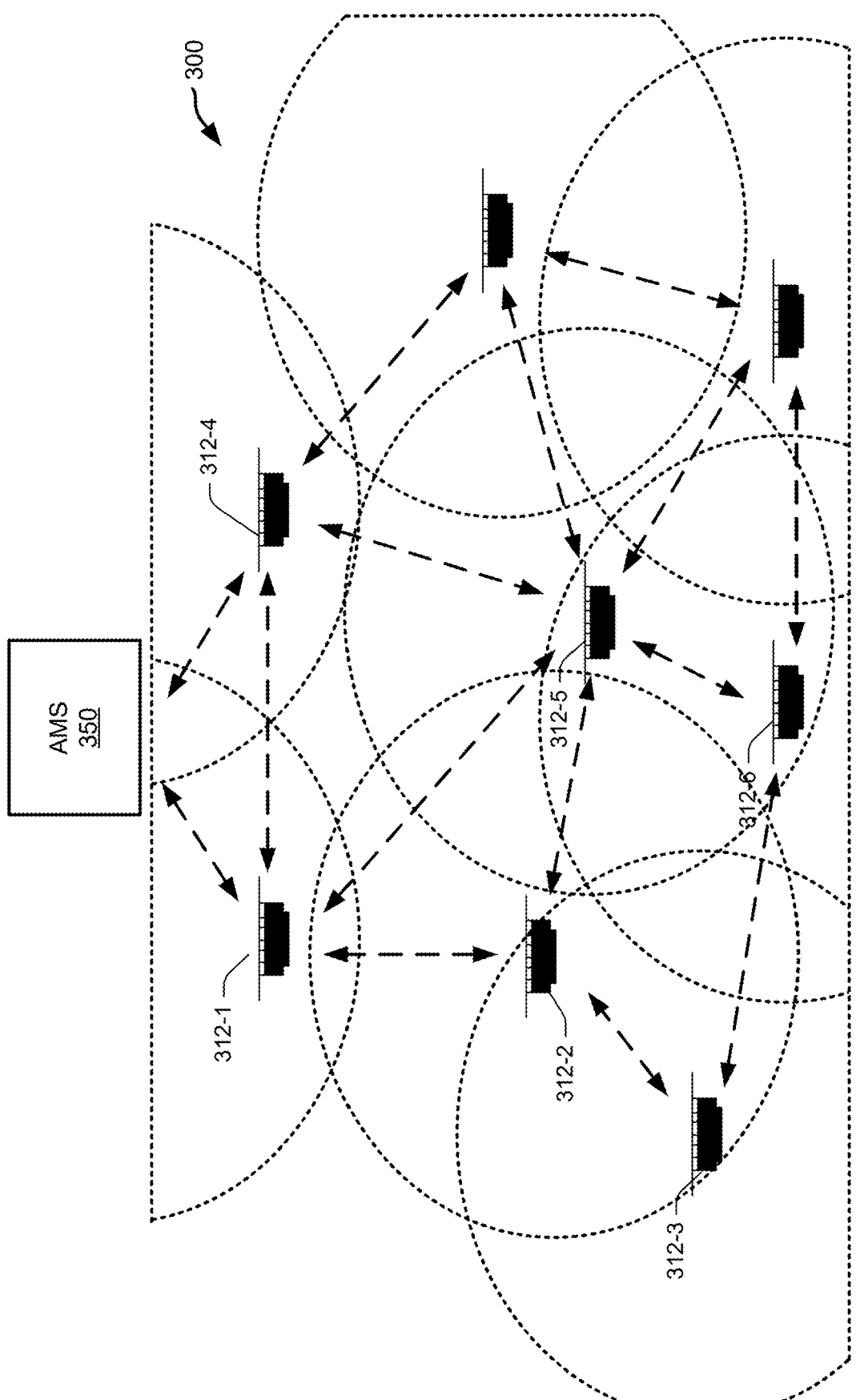
FIG. 3 is a diagram of an unmanned aerial vehicle network, according to an implementation.

FIG. 3 depicts a block diagram of a UAV network 300 within an AMS coverage area that includes UAVs 312 and an AMS, according to an implementation. In addition to the UAVs 312 wirelessly communicating with the AMS, the UAVs 312 may be configured to communicate with one another. For example, the UAVs 312 may be configured to form a wireless network that utilizes Wi-Fi or another wireless means of communication, each UAV communicating with other UAVs within wireless range. In other implementations, the UAVs 312 may utilize existing wireless networks (e.g., cellular, Wi-Fi, satellite) to facilitate UAV communication.

The wireless network may be utilized by the UAVs to transmit, for example, ADS-B information, sense and avoid and/or obstacle information, etc. to other UAVs in the network. Alternatively, if a UAV or other aircraft is not capable of transmitting ADS-B information, the AMS 350 may transmit the information on behalf of the UAV. In some implementations, if a UAV loses communication with other UAVs via the wireless network 300, it may activate another wireless communication path to regain connection. For example, if a UAV 312 cannot communicate with any other UAVs via the network 300, it may attempt to communicate with the AMS using the same or different means of wireless communication. If the UAV cannot establish communication with the AMS, the UAV 312 may activate a cellular and/or satellite communication path to obtain communication information from the remote computing resource and/or the AMS. If the UAV still cannot regain communication and/or if it does not include an alternative communication component, it may automatically and autonomously navigate toward a designated location (e.g., designated landing area and/or delivery location 303).

The wireless mesh network 300 may be used to provide communication between UAVs (e.g., to share weather information including wind speeds and directions, location information, routing information, topology information, navigation commands, landing areas), and/or the AMS 350. In addition, in some implementations, the wireless network 300 may be used to deliver content and/or other information to other computing resources, such as personal computers, electronic book reading devices, audio players, mobile telephones, tablets, desktops, laptops, etc. For example, the mesh network may be used to deliver electronic book content to electronic book reading devices of users.

Figure 4:
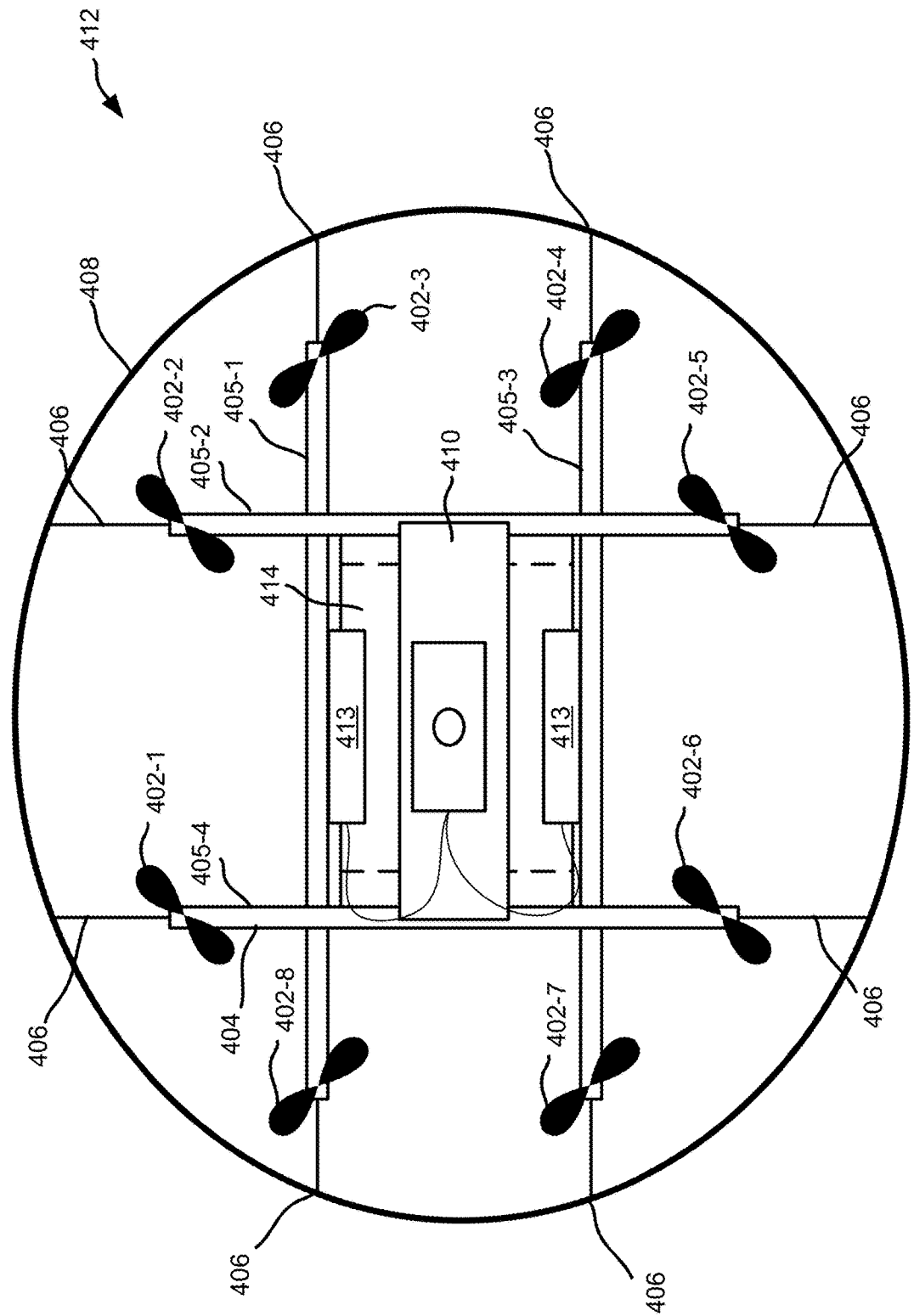
FIG. 4 is an illustration of a top-down view of an unmanned aerial vehicle, according to an implementation.

FIG. 4 illustrates a block diagram of a top-down view of a UAV 412 according to an implementation. As illustrated, the UAV 412 includes eight lifting propellers 402-1, 402-2, 402-3, 402-4, 402-5, 402-6, 402-7, 402-8 spaced about the frame 404 of the UAV. The lifting propellers 402 may be any form of propeller (e.g., graphite, carbon fiber) and of a size sufficient to lift the UAV 412 and any item engaged by the UAV 412 so that the UAV 412 can navigate through the air, for example, to deliver an item. While this example includes eight lifting propellers, in other implementations, more or fewer propellers may be utilized. Likewise, in some implementations, the lifting propellers may be positioned at different locations on the UAV 412. In addition, alternative methods of propulsion may be utilized. For example, fans, jets, turbojets, turbo fans, jet engines, and the like may be used to propel the UAV.

The frame 404 or body of the UAV 412 may likewise be of any suitable material, such as graphite, carbon fiber, and/or aluminum. In this example, the frame 404 of the UAV 412 includes four rigid members 405-1, 405-2, 405-3, 405-4, or beams arranged in a hash pattern with the rigid members intersecting and joined at approximately perpendicular angles. In this example, rigid members 405-1 and 405-3 are arranged parallel to one another and are approximately the same length. Rigid members 405-2 and 405-4 are arranged parallel to one another, yet perpendicular to rigid members 405-1 and 405-3. Rigid members 405-2 and 405-4 are approximately the same length. In some embodiments, all of the rigid members 405 may be of approximately the same length, while in other implementations some or all of the rigid members may be of different lengths. Likewise, the spacing between the two sets of rigid members may be approximately the same or different.

While the implementation illustrated in FIG. 4 includes four rigid members 405 that are joined to form the frame 404, in other implementations, there may be fewer or more components to the frame 404. For example, rather than four rigid members, in other implementations, the frame 404 of the UAV 412 may be configured to include six rigid members. In such an example, two of the rigid members 405-2, 405-4 may be positioned parallel to one another. Rigid members 405-1, 405-3 and two additional rigid members on either side of rigid members 405-1, 405-3 may all be positioned parallel to one another and perpendicular to rigid members 405-2, 405-4. With additional rigid members, additional cavities with rigid members on all four sides may be formed by the frame 404. As discussed further below, a cavity within the frame 404 may be configured to include an item engagement mechanism for the engagement, transport, and delivery of item(s) and/or containers that contain item(s).

In some implementations, the UAV may be configured for aerodynamics. For example, an aerodynamic housing may be included on the UAV that encloses the UAV control system 410, one or more of the rigid members 405, the frame 404, and/or other components of the UAV 412. The housing may be made of any suitable material(s) such as graphite, carbon fiber, aluminum, etc. Likewise, in some implementations, the location and/or the shape of the item engagement mechanism and/or any items or containers may be aerodynamically designed.

In some implementations, the item engagement mechanism may be configured such that, when an item and/or container is engaged, it is enclosed within the frame and/or housing of the UAV 412 so that no additional drag is created during transport of the item. In other implementations, the item and/or container may be shaped to reduce drag and provide a more aerodynamic design. For example, if a portion of a container extends below the UAV when engaged, the exposed portion of the container may have a curved shape.

The lifting propellers 402 and corresponding lifting motors are positioned at both ends of each rigid member 405. The lifting motors may be any form of motor capable of generating enough speed with the lifting propellers to lift the UAV 412 and any engaged item thereby enabling aerial transport of the item.

Extending outward from each rigid member is a support arm 406 that is connected to a safety barrier 408. In this example, the safety barrier 408 is positioned around and attached to the UAV 412 in such a manner that the motors and propellers 402 are within the perimeter of the safety barrier 408. The safety barrier may be plastic, rubber, etc. Likewise, depending on the length of the support arms 406 and/or the length, number or positioning of the rigid members 405, the safety barrier may be round, oval, or any other shape.

Mounted to the frame 404 is the UAV control system 410. In this example, the UAV control system 410 is mounted in the middle and on top of the frame 404. The UAV control system 410, as discussed in further detail below with respect to FIG. 8, controls the operation, routing, navigation, communication, and the item engagement mechanism of the UAV 412.

The UAV 412 also includes one or more power modules 413. In this example, the UAV 412 includes two power modules 413 that are removably mounted to the frame 404. The power module for the UAV may be in the form of battery power, solar power, gas power, super capacitor, fuel cell, alternative power generation source, or a combination thereof. For example, the power modules 413 may each be a 6000 mAh lithium-ion polymer battery, polymer lithium ion (Li-poly, Li-Pol, LiPo, LIP, PLI, or Lip) battery. The power module(s) 413 are coupled to and provide power for the UAV control system 410 and the propeller motors. In some implementations, one or more of the power modules may be configured such that it can be autonomously removed and/or replaced with another power module while the UAV is landed.

As mentioned above, the UAV 412 may also include an item engagement mechanism 414. The item engagement mechanism may be configured to engage and disengage items and/or containers that hold items. In this example, the item engagement mechanism 414 is positioned within a cavity of the frame 404 that is formed by the intersections of the rigid members 405. The item engagement mechanism may be positioned beneath the UAV control system 410. In implementations with additional rigid members, the UAV may include additional item engagement mechanisms and/or the item engagement mechanism 414 may be positioned in a different cavity within the frame 404. The item engagement mechanism 414 may be of any size sufficient to securely engage and disengage items and/or containers that contain items. In other implementations, the engagement mechanism may operate as the container, containing the item(s) to be delivered. The item engagement mechanism communicates with (via wired or wireless communication) and is controlled by the UAV control system 410.

As will be described in more detail below with respect to FIG. 8, the UAV control system 410 may operate in conjunction with or may otherwise utilize or communicate (e.g., via wireless communication) with one or more components of the management system 126, and/or the AMS. Likewise, components of the management system 126, and/or the AMS, may generally interact and communicate with the UAV control system 410.

While the implementations of the UAV discussed herein utilize lifting propellers to achieve and maintain flight, in other implementations, the UAV may be configured in other manners. In one implementation, the UAV may include fixed wings and/or a combination of both propellers and fixed wings.

Figure 5:
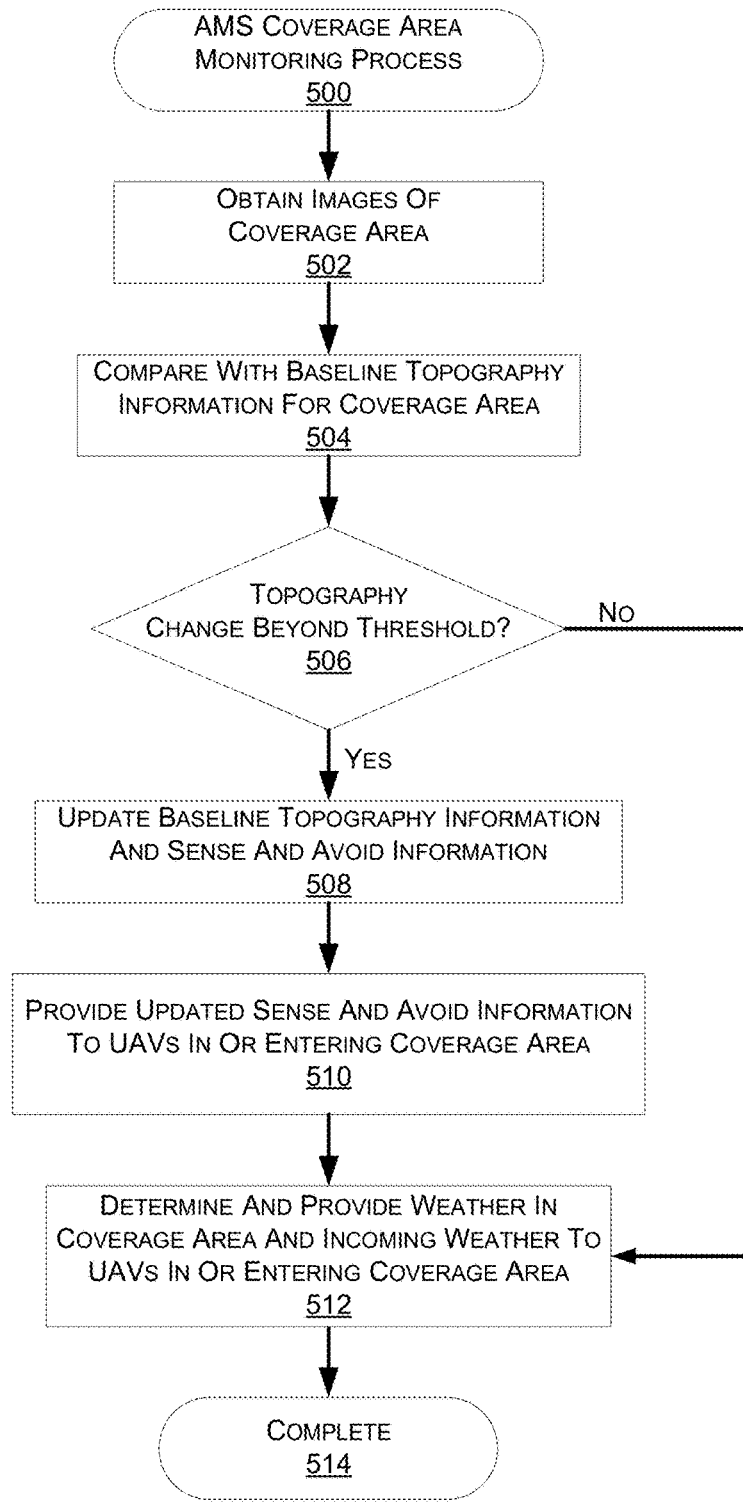
FIG. 5 is an aerial monitoring station coverage area monitoring process, according to an implementation.

FIG. 5 is a flow diagram illustrating an example AMS coverage area monitoring process 500, according to an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 500 may be performed by any one or combination of UAVs, AMSs, and/or the remote computing resources. The example process 500 begins by obtaining images of the coverage area, as in 502. For example, the image capture devices included on the AMS positioned above the coverage area may obtain images of the coverage area. Alternatively, or in addition thereto, UAVs within the coverage area may obtain images of the coverage area. If the example process is being performed by an AMS, the images are obtained by the AMS from the image capture devices on the AMS and/or obtained from the UAVs in the coverage area. If the example process is being performed by the remote computing resources, the images are obtained from the AMS and/or from UAVs that provide the images to the AMS. The images may be any type of images of the coverage area. For example, the images may be visual images of the coverage area, thermographic images, etc. Likewise, the images may also be accompanied by or include depth information representative of the distance between objects represented in the image and the image capture device that obtained the image.

The obtained images are compared with baseline topography information for the coverage area, as in 504. In some implementations, the example process 500 may be periodically performed and baseline topography information may be determined and stored for the coverage area. The baseline topography information may identify the topography of the coverage area and indicate the presence, position, size, and/or shape of objects (e.g., buildings, trees, hills, bridges, cranes) that are in the area. In one implementation, the images are processed using one or more image processing algorithms, such as edge detection, object detection, etc., to detect the presence, position, size, and/or shapes of objects in the coverage area. If depth information is also included with the images, the depth information may also be utilized to process the images to determine the presence, position, size, and/or shapes of objects in the coverage area. The information obtained from the processed images may be utilized as topography information for the coverage area. The topography information determined from obtained images is compared with previously determined topography information for the coverage area.

Based on the comparison of the obtained images with baseline topography information, a determination is made as to whether the topography has changed beyond a threshold, as in 506. The threshold may be any amount of difference between the topography information from the obtained images and the baseline topography information. In some implementations, the threshold may be zero such that any determined change in topography of the coverage area will result in a determination that the topography has changed beyond a threshold amount. In other implementations, the threshold may be a higher amount or percentage change to account for variations in image processing, seasons, etc. Likewise, in some implementations, the difference in the topography change may be considered on an object-by-object basis within the coverage area and it may be determined that the threshold has been exceeded if there has been a change in the topography of a portion of the coverage area (e.g., at a position of an object). For example, it may be determined that the topography of the coverage area has changed if it is determined that a crane has been placed on top of a building, or if a cell tower has been erected at a position within the coverage area, etc. In such an example, even though the topography of the entire coverage area may not have changed significantly, the topography of that portion of the coverage area may exceed the threshold.

If it is determined that all or a portion of the topography of the coverage area has changed beyond a threshold amount, the baseline image information is updated to include the obtained topography information and sense and avoid information for the coverage area is updated, as in 508. The sense and avoid information includes areas within a coverage area that are to be avoided by UAVs. For example, sense and avoid information may identify the position and/or height of buildings within the coverage area that are to be avoided by UAVs. The updated sense and avoid information is provided to UAVs positioned in the UAV coverage area and/or that are anticipated to be entering the UAV coverage area, as in 510.

In addition to determining topography changes for the coverage area and providing updated sense and avoid information to UAVs, or if it is determined at decision block 506 that the topography has not changed beyond a threshold, the example process 500 determines and provides to UAVs weather information pertaining to the weather within the coverage area, as well as weather incoming to the coverage area, as in 512. As discussed above, the AMS may include a weather station that can be used to determine the weather conditions within the coverage area. Likewise, because the AMS is at a high altitude, it may include sensors and/or cameras that can be used to detect weather changes (e.g., clouds) that are approaching the coverage area. In another example, one or more of the UAVs within the coverage area may collect weather related information that is provided to the AMS and/or other UAVs within the coverage area. In still another example, the remote computing resources may determine weather information relating to weather approaching the coverage area. For example, weather at adjacent AMS coverage areas may be determined and provided by other AMSs to the remote computing resources and the remote computing resources may wirelessly communicate that weather information to the AMS as incoming weather information. Upon providing the updated sense and avoid information to UAVs and/or weather information, the example process completes, as in 514.

Figure 6:
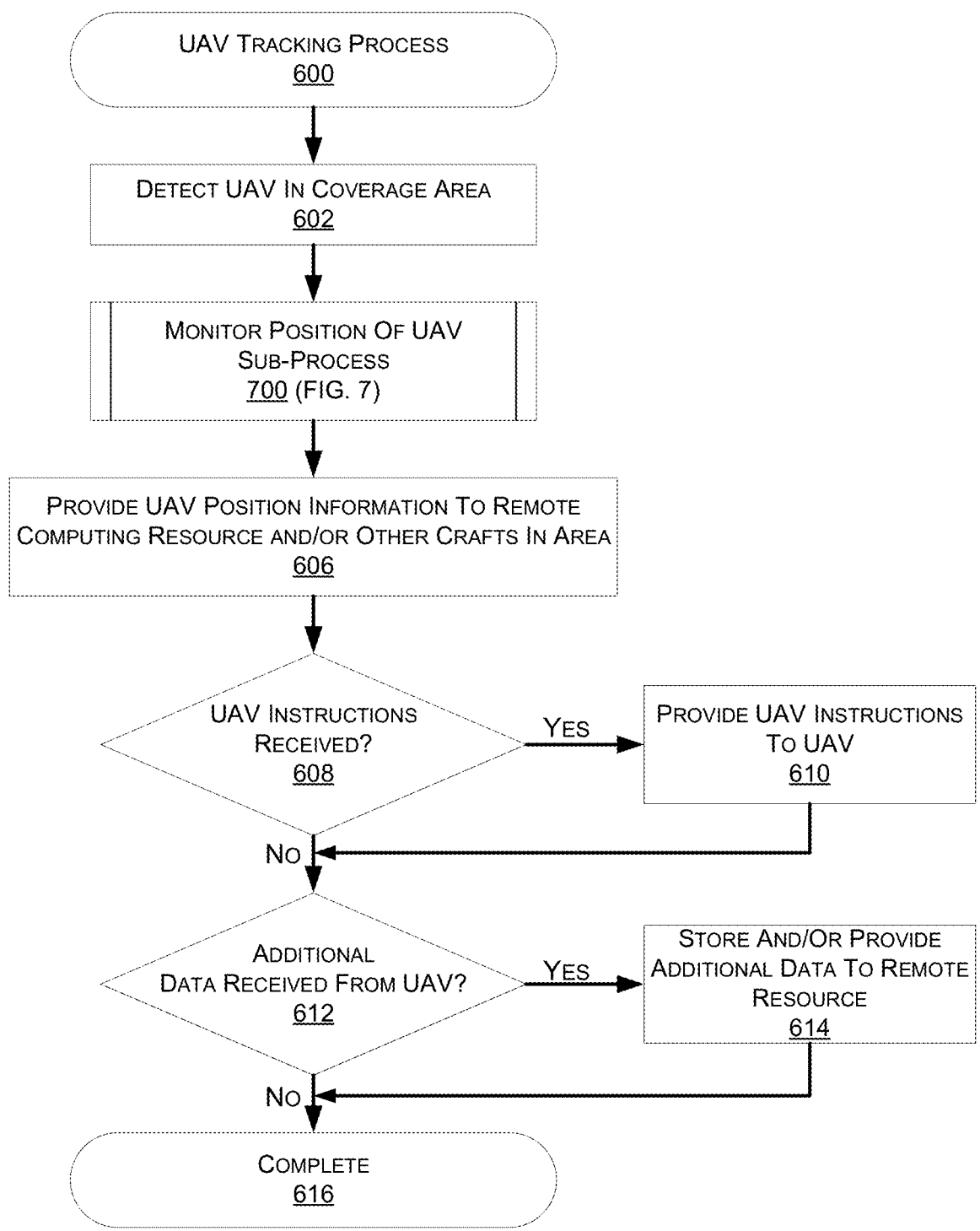
FIG. 6 is a flow diagram of an unmanned aerial vehicle tracking process, according to an implementation.

FIG. 6 is a flow diagram of an unmanned aerial vehicle tracking process 600, according to an implementation. The example process 600 begins by detecting a UAV in the AMS coverage area, as in 602. In some implementations, the remote computing resources may provide information to an AMS identifying UAVs entering or anticipated to enter the AMS coverage area. In another implementation, UAVs may wirelessly communicate with an AMS and identify their presence in the coverage area by sending a UAV identifier and/or initial position information to the AMS. In still another example, the AMS may continually obtain and process images of the coverage area to detect the presence of UAVs within the coverage area. Processing of images to detect UAVs in the coverage area is discussed in further detail below with respect to FIG. 7.

Figure 7:
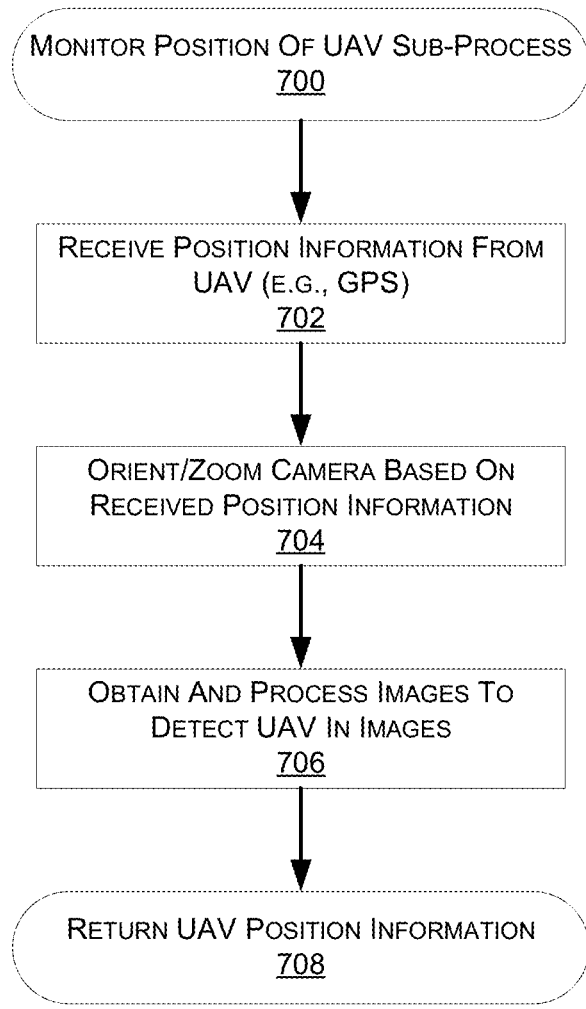
FIG. 7 is a flow diagram of a sub-process for monitoring a position of an unmanned aerial vehicle, according to an implementation.

Upon detecting the presence of a UAV in the AMS coverage area, the position of the UAV is monitored, as in the sub-process 700. The example sub-process 700, discussed below with respect to FIG. 7, provides one example for monitoring the position of a UAV within the coverage area.

The monitored UAV position information is provided to the remote computing resources and/or other crafts in the coverage area, as in 606. For example, the AMS may wirelessly transmit, to the remote computing resources, position information for each UAV in the coverage area. The position information may include the approximate geographic coordinates and altitude of the UAV, heading, speed, etc., and/or images of the UAV obtained by the AMS. Similar information may likewise be provided to other crafts located in the AMS coverage area. For example, in some implementations, the AMS may send ADS-B information to other crafts on behalf of a detected UAV. As another example, the position, heading, speed of a detected UAV may be provided to other UAVs in the area so that flight paths can be adjusted to avoid collisions between UAVs.

A determination is also made as to whether UAV instructions have been received, as in 608. For example, the remote computing resources may send navigation instructions, delivery location information, etc., for one or more UAVs to the AMS. In some implementations, the remote computing resources may provide delivery location information (e.g., time and approximate location for delivery of an item carried by the UAV). In other implementations, the remote computing resources may provide instructions to control, in approximately real-time, the navigation of the UAV. For example, the AMS may provide position information and/or images of the UAV to the remote computing resources and the remote computing resources may provide navigation commands (e.g., pitch, yaw, roll, acceleration, speed, heading, altitude) to the AMS that are relayed to the UAV for execution. In some implementations, the navigation commands may be determined and provided by a human operator at the remote computing resources. For example, the remote computing resources may present information received from the AMS to the human operator and the human operator may provide navigation commands to the remote computing resources. If it is determined that UAV instructions have been received, the UAV instructions are wirelessly transmitted to the UAV, as in 610.

In addition to providing UAV instructions to the UAV, or if it is determined at decision block 608 that no UAV instructions have been received, a determination is made as to whether additional data has been received from the UAV, as in 612. Additional data may be any additional data, such as images, power capabilities of the UAV, etc. In some implementations, the UAVs may monitor the surrounding area by obtaining images and/or depth information. The obtained images and/or depth information may be compared with sense and avoid information provided to the UAV by the AMS. If a difference is determined, the difference information and/or images of the area where the difference was determined may be sent from the UAV to the AMS.

If it is determined that additional data has been received from the UAV, that additional data is stored at the AMS and/or wirelessly sent to the remote computing resources, as in 614. Upon storing and/or providing the additional data to the remote computing resources, or if it is determined that no additional data has been received from the UAV, the example process completes, as in 616.

FIG. 7 is a flow diagram of a sub-process 700 for monitoring a position of an unmanned aerial vehicle, according to an implementation. In this example, the AMS receives initial position information from a UAV located within the AMS coverage area, as in 702. The initial position information may include the geographic position of the UAV, such as the latitude and longitude, which may be determined by the GPS of the UAV, as well as the altitude of the UAV. In some implementations, the initial position information may also include the speed, heading, orientation of the UAV, identifiers present on the UAV, UAV size information, etc. Based on the received initial position information, a camera or other image capture device of the AMS is oriented toward the UAV and/or the zoom is adjusted based on the received initial position information, as in 704. For example, the position of the AMS (geographic coordinates and altitude) may be known to the AMS and, based on the received initial position information for a UAV, it may be determined where to orient a camera so that images obtained by the camera will include a representation of the UAV. Likewise, based on the altitude of the AMS and the received altitude for the UAV, the zoom of the camera may be adjusted so that images obtained by the camera include a representation of the UAV that can be processed to detect the UAV.

Images are obtained from the camera and processed to detect the UAV in the images, as in 706. If the images are visual images, they may be processed using one or more image processing algorithms, such as edge detection, object detection, etc., to detect the UAV in the images. If the images are thermographic images, the images may be processed to detect the UAV based on a heat signature of the UAV. In some implementations, the UAV may include and/or emit an identifier or beacon that may be detected in the images and used to process the images. In one implementation, the UAV may emit a light pattern that is detectable from the obtained images. In another implementation, the UAV may include a graphical identifier (e.g., color, shape, character) on the frame or body of the UAV that may be detected in the image by processing the image. In still another implementation, the UAV may include one or more reflectors, such as retro reflectors, that are mounted to the UAV and/or extend from the body of the UAV. When the AMS is obtaining images that include a representation of the UAV, the AMS may direct a light (e.g., laser, collimated light source) that will reflect off the reflectors and enhance the visibility of the UAV and/or the detectability of the UAV in the obtained images.

In some implementations, the reflectors may also be utilized to detect the UAV from positions other than the AMS. For example, visibility of the UAV may be improved for a ground-based operator of the UAV. Specifically, a light may be directed toward the position of the UAV that will reflect off the reflectors and enhance the visibility of the UAV to the ground-based operator.

In implementations that utilize reflectors coupled to the UAV, the light source may be oriented toward the UAV based on the known or provided position information of the UAV. For example, if the UAV provides position information, that position information may be used to orient the light source toward the UAV so that the light will reflect off the reflectors coupled to the UAV.

If the images are processed and the UAV cannot be detected, the example process 700 may initiate an algorithm to further process the images and/or obtain additional images that are processed in an effort to detect the UAV. For example, segments of the currently obtained images that were not previously processed may be processed using the one or more image processing algorithms in an effort to detect a presence of the UAV. Likewise, additional images adjacent the last known location of the UAV and/or along a trajectory path of the UAV may be obtained and processed in an effort to detect the presence of the UAV.

Based on the processed images and detection of the UAV, UAV position information is returned, as in 708. The returned UAV position information may include additional position information and/or the images, or portions thereof, that include a representation of the UAV.

While the example discussed above with respect to FIG. 7 describes receiving initial position information from the UAV, orienting a camera of the AMS based on the received initial position information and obtaining images of the UAV, in other implementations, the UAV may be monitored using other techniques. For example, as discussed above, the image capture devices of the AMS may be positioned at different orientations so that images of substantially all of the AMS coverage area are obtained. Based on the known position of the AMS and the orientation of the image capture devices, the images may be combined and associated with coordinate information corresponding to the coverage area. When a UAV provides initial position information, that initial position information may be used in conjunction with the combined images to locate a portion of the combined images that may then be processed to detect a representation of the UAV within the images. In still other implementations, a UAV may not provide initial position information and the combined images may be processed for changes that are representative of a UAV and those portions of the images may be further processed to determine that the change in the image is a representation of a UAV.

Figure 8:
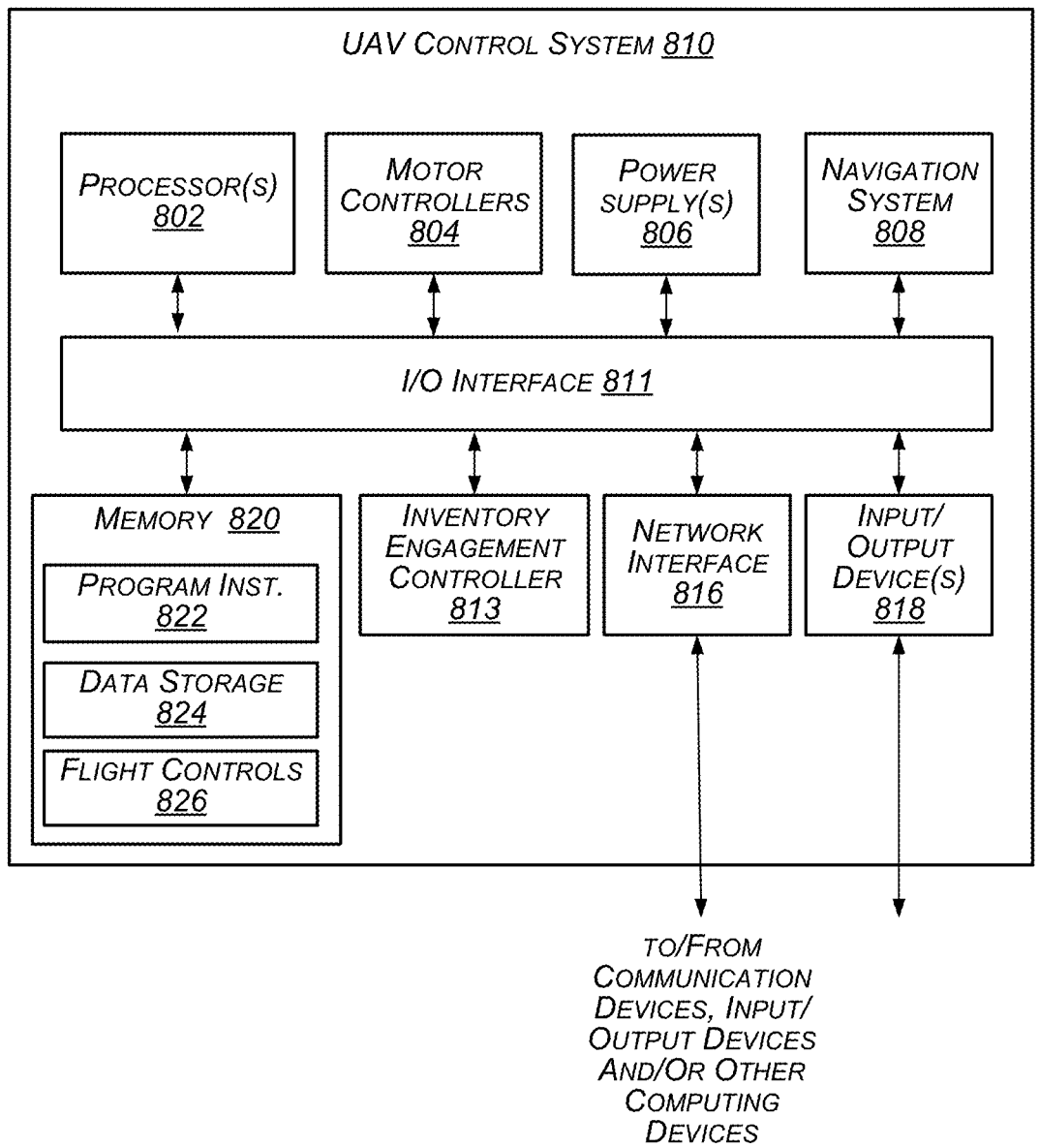
FIG. 8 is a block diagram of an example unmanned aerial vehicle control system, according to an implementation.

FIG. 8 is a block diagram illustrating an example UAV control system 810 that may be utilized with any of the UAVs discussed herein, such as the UAV 412 of FIG. 4. In various examples, the block diagram may be illustrative of one or more aspects of the UAV control system 810 that may be used to implement the various systems and methods discussed herein and/or to control operation of the UAV. In the illustrated implementation, the UAV control system 810 includes one or more processors 802, coupled to a memory, e.g., a non-transitory computer readable storage medium 820, via an input/output (I/O) interface 811. The UAV control system 810 may also include motor controllers 804, such as electronic speed controls (ESCs), power supply modules 806 and/or a navigation system 808. The UAV control system 810 further includes an inventory engagement controller 813, a network interface 816, and one or more input/output devices 818.

In various implementations, the UAV control system 810 may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions, data, flight paths, flight control parameters, component adjustment information, center of gravity information, and/or data items accessible by the processor(s) 802. In various implementations, the non-transitory computer readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 820 as program instructions 822, data storage 824 and flight controls 826, respectively. In other implementations, program instructions, data, and/or flight controls may be received, sent, or stored upon different types of computer-accessible media, such as non-transitory media, on similar media separate from the non-transitory computer readable storage medium 820 or the UAV control system 810. Generally speaking, a non-transitory, computer readable storage medium may include storage media or memory media, such as magnetic or optical media, e.g., disk or CD/DVD-ROM, coupled to the UAV control system 810 via the I/O interface 811. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 816.

In one implementation, the I/O interface 811 may be configured to coordinate I/O traffic between the processor(s)

802, the non-transitory computer readable storage medium 820, and any peripheral devices, the network interface or other peripheral interfaces, such as input/output devices 818. In some implementations, the I/O interface 811 may perform any necessary protocol, timing or other data transformations to convert data signals from one component (e.g., non-transitory computer readable storage medium 820) into a format suitable for use by another component (e.g., processor(s) 802). In some implementations, the I/O interface 811 may include support for devices attached through various types of peripheral buses, such as a variant of the Peripheral Component Interconnect (PCI) bus standard or the Universal Serial Bus (USB) standard, for example. In some implementations, the function of the I/O interface 811 may be split into two or more separate components, such as a north bridge and a south bridge, for example. Also, in some implementations, some or all of the functionality of the I/O interface 811, such as an interface to the non-transitory computer readable storage medium 820, may be incorporated directly into the processor(s) 802.

The motor controllers 804 communicate with the navigation system 808 and adjust the rotational speed of each lifting motor to stabilize the UAV and guide the UAV along a determined flight path.

The navigation system 808 may include a global positioning system (GPS), indoor positioning system (IPS), or other similar system and/or sensors that can be used to navigate the UAV to and/or from a location. The inventory engagement controller 813 communicates with the actuator(s) or motor(s) (e.g., a servomotor) used to engage and/or disengage items.

The network interface 816 may be configured to allow data to be exchanged between the UAV control system 810, other devices attached to a network, such as other computer systems (e.g., remote computing resources), and/or with UAV control systems of other UAVs. For example, the network interface 816 may enable wireless communication between the UAV and a UAV control system that is implemented on one or more remote computing resources and/or an AMS. For wireless communication, an antenna of a UAV or other communication components may be utilized. As another example, the network interface 816 may enable wireless communication between numerous UAVs and/or between the UAV and an AMS. In various implementations, the network interface 816 may support communication via wireless general data networks, such as a Wi-Fi network. For example, the network interface 816 may support communication via telecommunications networks, such as cellular communication networks, satellite networks, and the like.

Input/output devices 818 may, in some implementations, include one or more displays, imaging devices, thermal sensors, infrared sensors, time of flight sensors, accelerometers, pressure sensors, weather sensors, cameras, etc. Multiple input/output devices 818 may be present and controlled by the UAV control system 810. One or more of these sensors may be utilized to assist in landing as well as to sense and avoid obstacles during flight.

As shown in FIG. 8, the memory may include program instructions 822, which may be configured to implement the example processes and or sub-processes described herein. The data storage 824 may include various data stores for maintaining data items that may be provided for determining flight paths, landing, identifying locations for disengaging items, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 810 is merely illustrative and is not intended to limit the scope of the present disclosure. In particular, the control system may include any combination of hardware or software that can perform the indicated functions. The UAV control system 810 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 810. Some or all of the system components or data structures may also be stored (e.g., as instructions or structured data) on a non-transitory, computer-accessible medium or a portable article to be read by an appropriate drive. In some implementations, instructions stored on a computer-accessible medium separate from the UAV control system 810 may be transmitted to the UAV control system 810 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other UAV control system configurations.

Figure 9:
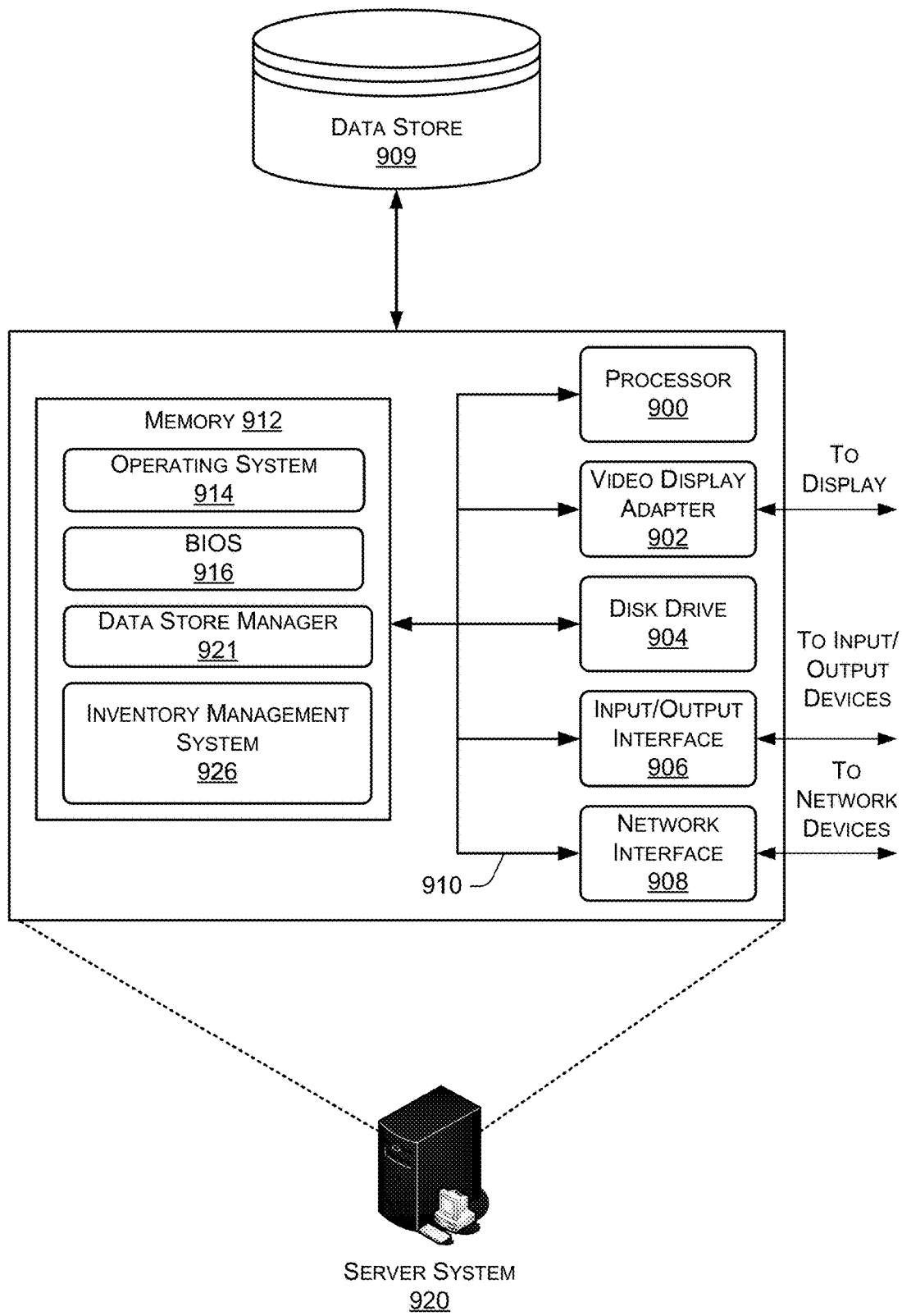
FIG. 9 is a pictorial diagram of an illustrative implementation of a server system that may be used in the implementations described herein.

FIG. 9 is a pictorial diagram of an illustrative implementation of a server system 920 that may be used in the implementations described herein. The server system 920 may include a processor 900, such as one or more redundant processors, a video display adapter 902, a disk drive 904, an input/output interface 906, a network interface 908, and a memory 912. The processor 900, the video display adapter 902, the disk drive 904, the input/output interface 906, the network interface 908, and/or the memory 912 may be communicatively coupled to each other by a communication bus 910.

The video display adapter 902 provides display signals to a display (not shown in FIG. 9) permitting a user of the server system 920 to monitor and configure operation of the server system 920, to view images of a UAV that are received from an AMS, and/or to provide information (e.g., navigation commands). The input/output interface 906 likewise communicates with external input/output devices not shown in FIG. 9, such as a mouse, keyboard, scanner, navigation controller, or other input and output devices that can be operated by a user of the server system 920. The network interface 908 includes hardware, software, or any combination thereof, to communicate with other computing devices. For example, the network interface 908 may be configured to provide communications between the server system 920 and other computing devices, such as that of an AMS, and/or a UAV via a network.

The memory 912 generally comprises random access memory (RAM), read-only memory (ROM), flash memory, and/or other volatile or permanent memory. The memory 912 is shown storing an operating system 914 for controlling the operation of the server system 920. A binary input/output system (BIOS) 916 for controlling the low-level operation of the server system 920 is also stored in the memory 912.

The memory 912 additionally stores program code and data for providing network services to AMSs, UAVs, and/or the management system. The program instructions enable communication with a data store manager application 921 to facilitate data exchange between the data store 909 and the management system.

As used herein, the term "data store" refers to any device or combination of devices capable of storing, accessing, and retrieving data, which may include any combination and number of data servers, databases, data storage devices and data storage media, in any standard, distributed or clustered environment. The server system 920 can include any appropriate hardware and software for integrating with the data store 909 as needed to execute aspects of one or more applications for an AMS, UAV, and/or the management system.

The data store 909 can include several separate data tables, databases or other data storage mechanisms and media for storing data relating to a particular aspect. For example, the illustrated data store 909 includes mechanisms for maintaining information related to operations, inventory, maps, GPS data, topography information, etc., which can be used to generate and deliver information to an AMS, UAV, and/or the management system 926. It should be understood that there might be additional aspects that can be stored in the data store 909 and that additional data stores beyond the one illustrated may be included. The data store 909 is operable, through logic associated therewith, to receive instructions from the server system 920 and obtain, update or otherwise process data in response thereto.

The memory 912 may also include the management system 926, discussed above. The management system 926 may be executable by the processor 900 to implement one or more of the functions of the server system 920. In one implementation, the management system 926 may represent instructions embodied in one or more software programs stored in the memory 912. In another implementation, the management system 926 can represent hardware, software instructions, or a combination thereof.

The server system 920, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction in FIG. 9 should be taken as being illustrative in nature and not limiting to the scope of the disclosure.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. An unmanned aerial vehicle monitoring system, comprising:
    an aerial monitoring station ("AMS") comprising an airship that maintains the AMS at an altitude above an AMS coverage area, and a plurality of image capture devices;
    wherein the AMS is configured to monitor positions of each of a plurality of unmanned aerial vehicles ("UAVs") located within the AMS coverage area;
    wherein the AMS is further configured to receive identifying information associated with an entering UAV as the entering UAV is entering the AMS coverage area so that the AMS can monitor the entering UAV, such that while the entering UAV is located within the AMS coverage area, the entering UAV is one of the plurality UAVS; and
    wherein, for each of the plurality of UAVs, the AMS is configured to receive respective position information, and the AMS is configured to adjust a respective image capture device based at least in part on respective position information of a respective one of the plurality of UAVs.

2. The system of claim 1, wherein the AMS is configured to adjust the respective image capture device by at least one of orienting the respective image capture device in a direction indicated by respective position information of the respective one of the plurality of UAVs, or altering a zoom of the respective image capture device based at least in part on the altitude of the AMS and an altitude indicated by respective position information of the respective one of the plurality of UAVs.

3. The system of claim 1, wherein the plurality of image capture devices comprises at least one of digital still cameras, video cameras, or thermographic imaging devices.

4. The system of claim 1, wherein the AMS coverage area is within a defined distance of the AMS such that the AMS can wirelessly communicate with each of the plurality of UAVs and obtain images that include visual representations of the UAVs.

5. The system of claim 1, wherein each of the plurality of UAVs sends to the AMS using wireless communication, at least one of position information, images obtained using an image capture device located on a UAV, or difference information based on a difference between topography information provided to the UAV and information obtained by sensors of the UAV.

6. The system of claim 1, wherein, for each of the plurality of UAVs, the respective image capture device is configured to obtain an image that includes a representation of the respective one of the plurality of UAVs.

7. The system of claim 1, wherein the AMS further comprises a wireless transmitter configured to transmit the images to a remote computing resource; and
wherein the remote computing resource is configured to process the images to detect each of the plurality of UAVs represented in the images.

8. The system of claim 7, further comprising:
a second AMS positioned at a second altitude and configured to monitor positions of each of a second plurality of UAVs located within a second AMS coverage area; and
wherein the second AMS is in wireless communication with at least one of the remote computing resource or the AMS.

9. A computer implemented method, comprising:
detecting, under control of one or more computing systems including a processor executing executable instructions, an unmanned aerial vehicle ("UAV") within a coverage area of an aerial monitoring station ("AMS"), wherein the AMS includes an airship positioned at an altitude above the coverage area;
monitoring, at the AMS, a position of the UAV, wherein the monitoring includes:
receiving position information from the UAV indicating the position of the UAV; and
adjusting an image capture device associated with the AMS based at least in part on the position information; and
receiving, at the AMS, identifying information associated with an entering UAV as the entering UAV is entering the coverage area of the AMS so that the AMS monitors the entering UAV while the entering UAV is located within the coverage area of the AMS, wherein monitoring of the entering UAV while it is located within the coverage area of the AMS includes:
receiving second position information from the entering UAV indicating a second position of the entering UAV; and
adjusting one of the image capture device or a second image capture device associated with the AMS based at least in part on the second position information.

10. The computer implemented method of claim 9, wherein adjusting the image capture device includes orienting the image capture device in a direction indicated by the position information.

11. The computer implemented method of claim 9, wherein adjusting the image capture device includes altering a zoom of the image capture device based on the position information.

12. The computer implemented method of claim 9, wherein the position information includes at least one of latitude, longitude, altitude, speed, heading, or orientation.

13. The computer implemented method of claim 9, wherein monitoring the position of the UAV further includes:
obtaining an image using the image capture device; and
processing the image to detect a representation of the UAV in the image.

14. The computer implemented method of claim 13, wherein processing the image includes detecting in the image an identifier associated with the UAV, wherein the identifier is at least one of a projected light pattern, a shape of the UAV, or a graphical identifier.

15. The computer implemented method of claim 9, further comprising:
sending the position information indicating the position of the UAV from the AMS to a remote computing resource;
receiving at the AMS an instruction for the UAV, the instruction including navigation instructions for the UAV; and
sending the instruction from the AMS to the UAV using a line of sight communication between the AMS and the UAV.

16. An aerial monitoring station ("AMS") apparatus, comprising:
an airship configured to maintain the AMS at an altitude above an AMS coverage area; and
a plurality of sensors associated with the AMS and oriented to monitor a respective portion of the AMS coverage area, the plurality of sensors including a plurality of image capture devices;
wherein the AMS is further configured to receive identifying information associated with an entering UAV as the entering UAV is entering or anticipated to enter the AMS coverage area so that the AMS can monitor the entering UAV, such that while the entering UAV is located within the AMS coverage area, the entering UAV is one of the plurality UAVS; and
wherein, for each of the plurality of UAVs positioned within the AMS coverage area, the AMS is configured to receive respective position information, and the AMS is configured to adjust a respective image capture device of the plurality of image capture devices based at least in part on respective position information of a respective one of the plurality of UAVs.

17. The apparatus of claim 16, wherein the plurality of image capture devices are oriented to obtain images of respective portions of the AMS coverage area; and
wherein images obtained by the plurality of image capture devices are wirelessly transmitted to a remote computing resource.

18. The apparatus of claim 17, further comprising:
a communication component associated with the AMS and configured to wirelessly communicate with each of the plurality of UAVs positioned within the AMS coverage area;

wherein the communication component is configured to at least one of:
  wirelessly receive data from at least one of the plurality of UAVs,
  wirelessly send the data to the remote computing resource,
  wirelessly receive navigation instructions from the remote computing resource, or
  wirelessly send, to at least one of the plurality of UAVs, the navigation instructions.

19. The apparatus of claim 16, further comprising:
at least one illumination element;
wherein the AMS is configured to adjust the at least one illumination element based at least in part on respective position information of a respective one of the plurality of UAVs.

20. The apparatus of claim 19, wherein the at least one illumination element is at least one of a laser or a collimated light source, and wherein light emitted from the at least one illumination element is reflected by at least one reflector associated with the respective one of the plurality of UAVs.

21. The apparatus of claim 16, wherein the identifying information is received from the entering UAV.

* * * * *